United States Patent [19]

Hayashi et al.

[11] 4,400,337

[45] Aug. 23, 1983

[54] METHOD FOR PRODUCTION OF METAL MAGNETIC PARTICLES

[75] Inventors: Yukihiro Hayashi, Suita; Toshinobu Sueyoshi, Kyoto; Shigeo Hirai, Ohtsu; Mikio Kishimoto, Kyoto; Katsunori Tashita, Suita; Masahiro Amemiya, Takatsuki, all of Japan

[73] Assignee: Hitachi Maxell, Ltd., Osaka, Japan

[21] Appl. No.: 337,149

[22] Filed: Jan. 5, 1982

[30] Foreign Application Priority Data

| | | | |
|---|---|---|---|
| Jan. 10, 1981 | [JP] | Japan | 56-2310 |
| Jan. 10, 1981 | [JP] | Japan | 56-2312 |
| Jan. 10, 1981 | [JP] | Japan | 56-2314 |
| Jan. 10, 1981 | [JP] | Japan | 56-2315 |

[51] Int. Cl.³ .............................................. C04B 15/14

[52] U.S. Cl. ...................................... 264/82; 264/129; 423/632

[58] Field of Search ................... 423/632; 264/82, 129

[56] References Cited

U.S. PATENT DOCUMENTS

| | | | |
|---|---|---|---|
| 4,309,459 | 1/1982 | Tokuoka | 423/632 X |
| 4,311,684 | 1/1982 | Umeki | 432/632 |

*Primary Examiner*—Bernard D. Pianalto

*Attorney, Agent, or Firm*—Birch, Stewart, Kolasch & Birch

[57] ABSTRACT

A method for the production of uniform acicular metal magnetic particles comprising predominantly iron which have excellent magnetic characteristics and are useful as a recording element for a magnetic recording medium, said method comprising the steps of coating the surface of metal compound particles containing predominantly acicular iron oxyhydroxide or iron oxides with at least one member selected from the group consisting of an aluminum compound and a silicon compound, pelletizing the coated particles, and reducing the pellets with heating under reducing atmosphere, e.g. under hydrogen stream.

10 Claims, No Drawings

METHOD FOR PRODUCTION OF METAL MAGNETIC PARTICLES

The present invention relates to a method for the production of metal magnetic particles comprising predominantly iron which are useful as a recording element for a magnetic recording medium, more particularly, to a method for the production of uniform acicular metal magnetic particles having excellent magnetic characteristics in a high yield.

Generally, a magnetic recording medium is required to have a high resolving ability, and hence, the recording element is to be in a size of less than 1 μm, and it is proposed to use a metallic iron having a higher coercive force than that of the conventional iron oxide. Furthermore, in order to improve the orientation property of the recording medium, the particle is made acicular.

Such acicular metal magnetic particles are usually produced by reducing with heating acicular iron oxide particles under a hydrogen stream. In this method, it is necessary to promptly exhaust steam produced in the reaction in order to promote the reduction reaction, and hence, the reduction of iron oxide particles are usually carried out by using hydrogen gas in a fluidization reduction furnace.

However, since the iron oxide particles are very fine particles, they are very difficult to handle while introducing into or taking out from the reaction system during the reaction step. Moreover, the particles are hardly uniformly dispersed into the hydrogen stream within the reduction furnace, and hence, the so-called slagging phenomenon occasionally appears wherein a floating layer of the particles is formed on the furnace wall, which results in the occurrence of a channelling phenomenon whereby irregular channel-shape spaces appear partially within the iron oxide particle layer and hydrogen gas flows partly through the channel. Because of these phenomena, the hydrogen does not uniformly contact each iron oxide particle, and hence, the reduction reaction does not uniformly proceed. Moreover, the temperature becomes partly too high, and hence, the metallic iron particles produced by the reduction are partly molten and thereby the molten parts are solidified to easily induce sintering. Thus, it is very difficult to obtain the desired metal magnetic particles having excellent acicular shape. Such a drawback appears remarkably when the iron oxide particles, per se, are reduced with hydrogen gas in a fluidization reduction furnace by the conventional method.

In order to avoid the above-mentioned problem in the production of acicular metal magnetic particles, the present inventors have intensively studied the improvement of the method for production of the same. As a result, it has surprisingly been found that the desired metal magnetic particles having excellent magnetic characteristics can be obtained by using iron compound particles such as particles of iron oxyhydroxide or iron oxides, coating the surface of the iron compound particles with an aluminum compound or silicon compound or both, pelletizing the resulting coated particles, and thereafter reducing the pellets under hydrogen stream. It has hitherto been considered that when particles are pelletized and then reduced with heating, undesirable sintering occurs between the solidified particles to result in deformation of the particle shape. However, the present inventors have unexpectedly found that when the iron compound particles are reduced after being coated with an aluminum compound or silicon compound or both and after pelletizing, the particles can easily be reduced with hydrogen without the occurrence of undesirable sintering.

An object of the present invention is to provide an improved method for the production of metal magnetic particles having excellent magnetic characteristics. Another object of the invention is to provide an improved method for reducing iron compound particles under hydrogen without the occurrence of sintering of particles. These and other objects as well as advantages of the present invention will be apparent from the following description.

According to the present invention, the desired acicular metal magnetic particles can be produced by coating the surface of metal compound particles containing predominantly acicular iron oxyhydroxide or iron oxides with at least one member selected from the group consisting of an aluminum compound and a silicon compound, pelletizing the coated particles, and then reducing the pellets with heating under reducing atmosphere to give acicular magnetic particles comprising predominantly iron.

According to this method, the desired metal magnetic particles can be produced without occurrence of undesirable sintering which is usually observed in the conventional method. The reason why such a sintering does not occur during the reduction is not clear, but it may be assumed that when the iron compound particles are reduced with heating under hydrogen stream after being coated with an aluminum compound and/or silicon compound and then being pelletized, the hydrogen flows smoothly in the gaps between the pelletized products to promptly exhaust the produced moisture from the reaction system, and thereby the reaction proceeds rapidly and uniformly and undesirable excess reduction reaction is inhibited.

Moreover, in the present invention, since the iron compound particles are coated with an aluminum compound and/or a silicon compound, the undesirable sintering of particles can be prevented even by reduction at a high temperature. Besides, the aluminum compound and/or silicon compound act as a binder, and hence, the particles coated with them can easily and smoothly be formed into pellet groups. Since the particles are subjected to the reduction step after being pelletized, the particles are not flown away even by the lift of the hydrogen stream, and hence, a large amount of hydrogen gas can be supplied at a high speed and the reduction reaction can uniformly be achieved within a short period of time, by which the desired magnetic particles having excellent magnetic characteristics can be obtained. After the reduction reaction is finished, the final product can easily be taken out with less occurrence of dangerous spontaneous ignition because the pelletized particles have a smaller surface area and the each particles are coated with an aluminum compound or silicon compound.

The starting particles used in the present invention, i.e. the iron compound particles a containing predominantly iron oxyhydroxide and/or iron oxides include compounds of the formulae: α-FeOOH, β-FeOOH, γ-FeOOH, α-$Fe_2O_3$, γ-$Fe_2O_3$, $Fe_3O_4$ and intermediates thereof, and also compounds of these iron oxides containing as an alloy component, Ni, Co, Cr, Mn, Mg, Ca, Sn, Bi, etc.

Suitable examples of the aluminum compound used in the present invention are water-soluble aluminum compounds such as aluminum sulfate, aluminum nitrate, aluminum chloride, and water-soluble aluminates such as sodium aluminate, or the like.

Suitable examples of the silicon compound are water-soluble silicates such as sodium orthosilicate, sodium metasilicate, potassium orthosilicate, potassium metasilicate, water glasses having various compositions, or the like.

Coating of the iron compound particles with an aluminum compound can be carried out by the steps of dissolving an aluminum compound in an aqueous alkaline solution, dispersing the particles to be coated in the aqueous solution, and then neutralizing the solution by blowing carbon dioxide gas into the solution or adding an acid thereto, by which crystalline or non-crystalline aluminum oxide hydrate is adhered onto the surface of the particles. The coating amount of the aluminum compound is preferably in the range of 0.01 to 2.0% by weight (calculated as the atomic ratio: Al/Fe). When the amount of the aluminum compound is smaller than the above range, the desired coating effect is not achieved, but on the other hand, when the amount is over the above range, the iron compound particles become porous or the pellets are deformed, and the resulting metal magnetic particles show inferior maximum magnetization moment.

Coating of the iron compound particles with a silicon compound may be carried out by dispersing the particles into an aqueous solution of the silicon compound and thereby adsorbing the silicon compound onto the surface of the particles But preferably, the coating is carried out by the steps of dispersing the particles into an aqueous alkaline solution of the silicon compound, and then neutralizing the solution by blowing carbon dioxide gas into the solution or adding an acid thereto, by which silicic acid hydrate is adhered onto the surface of the particles. The coating amount of the silicon compound is preferably in the range of 0.1 to 10% by weight (calculated as the atomic ratio: Si/Fe).

The aluminum compound and silicon compound both may be coated simultaneously, or the aluminum compound may first be coated and the silicon compound may be coated thereon after subjecting to a heat treatment as mentioned hereinafter.

The iron compound particles coated with an aluminum compound and/or a silicon compound can be pelletized by various methods, for example, by dispersing the particles into water, and then dehydrating with compression with a filter press so that the water content of the particles becomes 60 to 80% by weight (compression molding method); by adding water to the particles until the water content thereof becomes 35 to 45% by weight, kneading the mixture with a kneading machine, and then molding the mixture into pellet shape with an extrusion molding machine (extrusion molding method); or by compressing the particles in dry state under a compression of 200 to 1,000 kg/cm$^2$ with a tableting machine (tableting method). The pellets obtained by any one of these methods have preferably a size of 0.5 to 30 mm in average. When the pellet size is smaller than 0.5 mm, undesirable partial flow of hydrogen gas occurs during the heating reduction step, or undesirable flying away of particles occurs with increased flow of hydrogen gas, and hence, the hydrogen gas can not effectively be supplied, which results in insufficient reduction reaction. On the other hand, when the pellet size is larger than 30 mm, too much time is required for the hydrogen gas to sufficiently penetrate within the pellets, and further, the diffusion of steam within the pellets, which is a rate-determining factor of the reduction reaction becomes slow, by which the reduction time is prolonged and the productivity of metal magnetic particles is decreased. While the reduction reaction is rate-determined by the diffusion of steam within the pellets also in the range of the pellet size of 0.5 to 30 mm, the diffusion of steam is not largely inhibited when the pellet size is in the range of 0.5 to 30 mm because the pellets have pores through which moisture contained in the pellets and crystalline water of the hydrates are exhausted. Accordingly, the reduction time is similar to the case when the iron compound particles per se are reduced. Thus, when the pellets have a size of 0.5 to 30 mm, the reduction reaction can proceed effectively without prolonging of the reduction time. Besides, the shape of the pellets is not necessary, as long as the size is in the range of 0.5 to 30 mm.

The iron compound particles coated with an aluminum compound and/or a silicon compound may optionally be subjected to a heat treatment at a temperature of 200 to 1,000° C. before or after being pelletized. By this heat treatment, the magnetic characteristics of the metal magnetic particles are more improved because of the promotion of such desirable phenomena as closing of the pores for dehydrating in the pellets and decreasing of the surface area of the particles due to a shrinking of the particles during the reduction reaction In addition, the undesirable deformation of pellets during the reduction reaction, and hence, the uniform acicular shape of the particles is effectively maintained and the undesirable decrease of maximum magnetization moment is inhibited. Moreover, by the heat treatment, the aluminum and/or silicon compound forms a strong and dense coating layer, and therefore undesirable sintering between pellets and also between particles is effectively inhibited. When the heat treatment is carried out at a temperature of lower than 200° C., the desired effect can not be achieved, and on the other hand, when the temperature is higher than 1,000° C., undesirable sintering between particles occurs resulting in the loss of acicular shape of the particles and in the decrease of coercive force and squareness ratio. During this heat treatment, the iron oxyhydroxide is converted into iron oxides.

The pelletized product of iron compound particles, which is obtained by coating with an aluminum and/or silicon compound and pelletizing and optionally subjecting to heat treatment at 200° to 1,000° C. before or after the pelletization, are reduced by heating at a temperature of 300° to 600° C. under an atmosphere of a reducing gas such as hydrogen gas in a stationary reduction furnace, by which there is obtained the desired metal magnetic particles comprising predominantly metallic iron.

The present invention is illustrated by the following Examples but is not limited thereto.

The examples comprise the steps of (I) producing α-ferric oxyhydroxide (α-FeOOH), (II) coating the surface of the α-ferric oxyhydroxide particles, (III) pelletizing, (IV) heat treating and dehydrating, and (V) reducing, each of which are explained in detail below.

(I) Step of producing α-ferric oxyhydroxide (i) To an aqueous sodium hydroxide solution (100 liters, concentration: 5 mole/liter) is added with stirring an aqueous solution of ferrous sulfate ($FeSO_4 \cdot 7H_2O$) (100 liters, concentration: 0.719 mole/liter), and the mixture is reacted to give greenish milky white precipitates of ferrous hydroxide. This suspension has a pH of higher than 12. Into the suspension containing precipitates is blown air at a rate of 110 liter/minute while keeping the suspension at 60° C., and the mixture is stirred for 8 hours to give a suspension of α-ferric oxyhydroxide. The α-ferric oxyhydroxide thus obtained has a particle size of 0.6μ and an axial ratio (ratio of the long axis to the short axis of the particles) of 15. When the reaction is completed, the resulting suspension has a pH of 13.6. This suspension is hereinafter referred to as "Suspension A".

(ii) To an aqueous sodium hydroxide solution (100 liters, concentration: 5 mole/liter) is added with stirring an aqueous solution of ferrous sulfate ($FeSO_4$) and nickel sulfate ($NiSO_4$) (100 liters, concentration of $FeSO_4$: 0.719 mole/liter, concentration of $NiSO_4$: 0.03 mole/liter), and the mixture is reacted to give greenish milky white co-precipitates of ferrous hydroxide and nickel hydroxide. Into the suspension containing the co-precipitates is blown air at a rate of 110 liter/minute while keeping it at 60° C., and the mixture is stirred for 10 hours to give a suspension of α-ferric oxyhydroxide wherein nickel is contained as a solid solution. The resulting nickel-α-ferric oxyhydroxide solid solution has a particle size of 0.6μ and an axial ratio of 15. When the reaction is completed, the suspension has a pH of 13.6. This suspension is hereinafter referred to as "Suspension B".

(II) Step of coating the surface of the α-ferric oxyhydroxide particles (i) Coating of aluminum oxide hydrate To the suspension is added an aqueous solution of aluminum sulfate ($Al_2(SO_4)_3$) (1.4 liter, concentration: 0.1 mole/liter), and the mixture is stirred. After stirring well, carbon dioxide gas is blown into the mixture in order to neutralize the mixture to lower than pH 10, by which aluminum oxide hydrate ($Al_2O_3.nH_2O$) is coated onto the surface of particles of α-ferric oxyhydroxide. This step is hereinafter referred to as "Step (a)".

(ii) Coating of silicic acid hydrate

To the suspension is added an aqueous solution of sodium orthosilicate ($Na_4SiO_4$) (5.37 liters, concentration: 2 mole/liter), and the mixture is stirred. After stirring well, carbon dioxide gas is blown into the mixture in order to neutralize the mixture to lower than pH 10, by which silicic acid hydrate ($SiO_2.nH_2O$) is coated onto the surface of particles of α-ferric oxyhydroxide. This step is hereinafter referred to as "Step (b)".

(iii) Coating of aluminum oxide hydrate and silicic acid hydrate

To the suspension are added an aqueous solution of aluminum sulfate ($Al_2(SO_4)_3$) (1.4 liter, concentration: 0.1 mole/liter) and an aqueous solution of sodium orthosilicate ($Na_4SiO_4$) (5.37 liters, concentration: 2 mole/liter), and the mixture is stirred. After stirring well, carbon dioxide gas is blown into the mixture in order to neutralize the mixture to lower than pH 10, by which aluminum oxide hydrate ($Al_2O_3.nH_2O$) and silicic acid hydrate ($SiO_2.nH_2O$) are coated onto the surface of particles of α-ferric oxyhydroxide. This step is hereinafter reffered to as "Step (c)".

(III) Step of pelletizing

After the above coating step, the resulting α-ferric oxyhydroxide particles are washed with water, and then are dehydrated under a pressure of 5 kg/cm$^2$ with a filter press, and the resulting plate material is cut in a size of 0.5 cm×1.0 cm×1.0 cm, and then dried at 130° C. to give pellets having a size of 0.3 cm×0.7 cm×0.7 cm.

(IV) Step of heat treating and dehydrating (i) The pellets obtained in the above pelletizing step are put in an electric furnace and are dehydrated in air with heating at 300° C. for 4 hours to given α-iron oxide particles having coated surface (5 kg). This step is hereinafter referred to as "Step (d)".

(ii) The pellets obtained in the above pelletizing step are put in an electric furnace and are heated in air at 900° C. for 2 hours to give α-iron oxide particles having coated surface (5 kg). This step is hereinafter referred to as "Step (e)".

(V) Step of reducing

α-Iron compound particles (3 kg) are packed in a height of 25 cm within a vertical stationary reduction furnace (inside diameter: 20 cm, depth: 50 cm) and are reduced by passing hydrogen gas at a rate of 17 Nm$^3$/hour (flow rate: 15 cm/sec) at 500° C. for 4 hours to give metallic iron particles.

By an appropriate combination of the above steps I to V, the following examples are carried out.

EXAMPLE 1

Suspension A obtained in the step of producing α-ferric oxyhydroxide (I)-(i) is subjected to the step of coating by Step (a). After the step of pelletizing, the resulting pellets are subjected to the step of heat treating and dehydrating by Step (d) and then subjected to the step of reducing to give the desired metal particles.

EXAMPLE 2

Suspension B obtained in the step of producing α-ferric oxyhydroxide (I)-(ii) is subjected to the step of coating by Step (a). After the step of pelletizing, the resulting pellets are subjected to the step of heat treating and dehydrating by Step (d) and then subjected to the step of reducing to give the desired metal particles.

EXAMPLE 3

Suspension A obtained in the step of producing α-ferric oxyhydroxide (I)-(i) is subjected to the step of coating by Step (b). After the step of pelletizing, the resulting pellets are subjected to the step of heat treating and dehydrating by Step (d) and then subjected to the step of reducing to give the desired metal particles.

EXAMPLE 4

Suspension B obtained in the step of producing α-ferric oxyhydroxide (I)-(ii) is subjected to the step of coating by Step (b). After the step of pelletizing, the resulting pellets are subjected to the step of heat treating and dehydrating by Step (d) and then subjected to the step of reducing to give the desired metal particles.

EXAMPLE 5

Suspension B obtained in the step of producing α-ferric oxyhydroxide (I)-(ii) is subjected to the step of coating by Step (c). After the step of pelletizing, the resulting pellets are subjected to the step of reducing (without subjecting to the step of heat treating and dehydrating) to give the desired metal particles.

EXAMPLE 6

Suspension B obtained in the step of producing α-ferric oxyhydroxide (I)-(ii) is subjected to the step of coating by Step (c). After the step of pelletizing, the resulting pellets are subjected to the step of heat treating and dehydrating by Step (e) and then subjected to the step of reducing to give the desired metal particles.

REFERENCE EXAMPLE 1

Suspension A obtained in the step of producing α-ferric oxyhydroxide (I)-(i) is subjected to the step of pelletizing without subjecting to the step of coating. The resulting pellets are subjected to the step of heat treating and dehydrating by Step (d) and then subjected to the step of reducing to give metal particles.

REFERENCE EXAMPLE 2

Suspension B obtained in the step of producing α-ferric oxyhydroxide (I)-(ii) is subjected to the step of pelletizing without subjecting to the step of coating, and then subjected to the step of reducing without subjecting to the step of heat treating and dehydrating to give metal particles.

REFERENCE EXAMPLE 3

Suspension B obtained in the step of producing α-ferric oxyhydroxide (I)-(ii) is washed with water without subjecting to the step of coating, and the α-ferric oxyhydroxide particles are separated by filtration and dried at 130° C. The dried particles are pulverized with a mortar, and the pulverized particles are subjected to the step of reducing to give metal particles.

As to the metal particles obtained in Examples 1 to 6 and Reference Examples 1 to 3, particle size, axial ratio and specific surface area (by $N_2$ gas adsorption method) were measured. Besides, the coercive force (Hc), maximum magnetization moment ($\sigma s$) and squareness ratio ($\sigma r/\sigma s$) of the metal particles were also measured at an applied magnetic field of 10,000 oersteds by using a vibration magnetometer (VSM, made by To-ei Kogyo K.K.). The results are shown in the following table.

| Example No. | Particle size (μm) | Axial ratio | Specific surface area ($m^2/g$) | Coercive force Hc (oersted) | $\sigma_s$ (emu/g) | $\sigma_r/\sigma_s$ |
|---|---|---|---|---|---|---|
| Ex. 1 | 0.35 | 10 | 42 | 1300 | 152 | 0.50 |
| Ex. 2 | 0.30 | 15 | 46 | 1360 | 155 | 0.50 |
| Ex. 3 | 0.35 | 10 | 35 | 1290 | 158 | 0.50 |
| Ex. 4 | 0.30 | 15 | 39 | 1380 | 155 | 0.50 |
| Ex. 5 | 0.30 | 15 | 48 | 1400 | 158 | 0.51 |
| Ex. 6 | 0.30 | 15 | 29 | 1520 | 165 | 0.52 |
| Ref. Ex. 1 | 0.30 | 3 | 8 | 520 | 162 | 0.31 |
| Ref. Ex. 2 | 0.25 | 4 | 12 | 700 | 163 | 0.38 |
| Ref. Ex. 3 | 0.30 | 10 | — | 1180 | 148 | 0.48 |

As is clear from the above result, the metal magnetic particles produced by the present invention show excellent magnetic characteristics.

What is claimed is:

1. A method for the production of acicular metal magnetic particles comprising predominantly iron, which comprises the steps of coating the surface of metal compound particles containing predominantly acicular iron oxyhydroxide or iron oxides with at least one member selected from the group consisting of an aluminum compound and a silicon compound, pelletizing the coated particles to form pellets having an average size of from 0.5 to 30 mm, and reducing the thus produced pellets with heating under reducing atmosphere.

2. A method according to claim 1, wherein said pelletizing step comprises a tableting method comprising compressing the coated metal compound particles in a dry state under a compression of about 200 to 1,000 $kg/cm^2$ with a tableting machine.

3. A method according to claim 1, wherein the coating step is carried out with both an aluminum compound and a silicon compound.

4. A method according to claim 1, wherein the pellets are subjected to a heat treatment at a temperature of 200° to 1,000° C. before being subjected to the reduction step.

5. A method according to claim 1, wherein the coated particles are subjected to a heat treatment at a temperature of 200° to 1,000° C. before being subjected to the pelletizing step.

6. A method according to claim 5, wherein the particles are first coated with an aluminum compound, then the coated particles are subjected to said heat treatment and then the heat treated particles are coated with a silicon compound.

7. A method according to claim 1, wherein the coating with an aluminum compound is carried out in an amount of 0.01 to 2.0% by weight (calculated as the atomic ratio: Al/Fe), and the coating with a silicon compound is carried out in an amount of 0.1 to 10% by weight (calculated as the atomic ratio: Si/Fe).

8. A method according to claim 1, wherein said silicon compound is a member selected from the group consisting of aluminum sulfate, aluminum nitrate, aluminum chloride, sodium aluminate and water-soluble aluminates.

9. A method according to claim 1, wherein said pelletizing step comprises a compression molding method comprising:

(a) dispersing the coated metal compound particles in water; and (b) dehydrating the particles with compression with a filter press so that the water content of the particles becomes about 60 to 80% by weight.

10. A method according to claim 1, wherein said pelletizing step comprises an extrusion molding method comprising:

(a) adding water to the coated metal compound particles until the water content thereof becomes about 35 to 45% by weight;

(b) kneading the resultant mixture; and (c) extrusion molding the mixture into pellet shaped particles.

* * * * *